(12) United States Patent
Yamanaka

(10) Patent No.: US 12,459,572 B2
(45) Date of Patent: Nov. 4, 2025

(54) VEHICLE FRONT STRUCTURE HAVING AN ANNULAR ENGINE COMPARTMENT CROSS MEMBER

(71) Applicant: TOYOTA JIDOSHA KABUSHIKI KAISHA, Toyota (JP)

(72) Inventor: Yuki Yamanaka, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 381 days.

(21) Appl. No.: 18/123,490

(22) Filed: Mar. 20, 2023

(65) Prior Publication Data

US 2023/0303177 A1 Sep. 28, 2023

(30) Foreign Application Priority Data

Mar. 22, 2022 (JP) ................................. 2022-045925

(51) Int. Cl.
| | | |
|---|---|---|
| *B62D 21/15* | (2006.01) | |
| *B60R 19/34* | (2006.01) | |
| *B62D 25/08* | (2006.01) | |
| *B62D 25/14* | (2006.01) | |
| *B62D 25/20* | (2006.01) | |

(52) U.S. Cl.
CPC ......... *B62D 21/152* (2013.01); *B62D 25/082* (2013.01); *B62D 25/2018* (2013.01); *B60R 19/34* (2013.01); *B62D 25/14* (2013.01)

(58) Field of Classification Search
CPC . B62D 21/152; B62D 25/082; B62D 25/2018
See application file for complete search history.

(56) References Cited

U.S. PATENT DOCUMENTS

| | | | | |
|---|---|---|---|---|
| 2,189,719 A | * | 2/1940 | Wallace | B62D 21/02 280/781 |
| 2005/0082876 A1 | * | 4/2005 | Akasaka | B62D 25/2018 296/203.01 |
| 2008/0066886 A1 | | 3/2008 | Mabuchi et al. | |
| 2018/0154943 A1 | * | 6/2018 | Huang | B62D 21/02 |
| 2019/0126983 A1 | | 5/2019 | Okura et al. | |

(Continued)

FOREIGN PATENT DOCUMENTS

| | | | | |
|---|---|---|---|---|
| JP | 2010-184574 A | | 8/2010 | |
| JP | 2010221991 A | * | 10/2010 | ........... B62D 21/152 |

(Continued)

*Primary Examiner* — Daniel J Colilla
(74) *Attorney, Agent, or Firm* — Dinsmore & Shohl LLP

(57) ABSTRACT

A vehicle front structure comprising a pair of front side members which are provided on both side portions at a vehicle front side and extended in the vehicle longitudinal direction, and an engine compartment cross member which is attached between the pair of front side members, wherein the engine compartment cross member is an annular member including a pair of side members which are respectively attached to the inside surface in the vehicle width direction of each of the front side members and extended in the vehicle longitudinal direction, a front cross member which connects respective front ends of the pair of side members in the vehicle width direction, and a rear cross member which connects respective rear ends of the pair of the side members in the vehicle width direction, and the rear cross member is curved to protrude toward the rear side of the vehicle.

14 Claims, 14 Drawing Sheets

(56) References Cited

U.S. PATENT DOCUMENTS

| | | |
|---|---|---|
| 2019/0126989 A1 | 5/2019 | Okura |
| 2020/0156485 A1* | 5/2020 | Kamikihara ........... B62D 21/11 |
| 2021/0122221 A1 | 4/2021 | Nakamura et al. |
| 2021/0179178 A1 | 6/2021 | Jeong |

FOREIGN PATENT DOCUMENTS

| | | | |
|---|---|---|---|
| JP | 2019-085087 A | 6/2019 | |
| JP | 2019-085088 A | 6/2019 | |
| JP | 2019156063 A * | 9/2019 | ............ B62D 21/02 |
| JP | 2020-037310 A | 3/2020 | |
| JP | 2021-066340 A | 4/2021 | |
| JP | 2021-095114 A | 6/2021 | |
| WO | 2012/153053 A1 | 11/2012 | |

\* cited by examiner

C-C CROSS SECTION

VEHICLE FRONT STRUCTURE HAVING AN ANNULAR ENGINE COMPARTMENT CROSS MEMBER

CROSS REFERENCE TO RELATED APPLICATION

This application claims priority to Japanese Patent Application No. 2022-045925 filed on Mar. 22, 2022, which is incorporated herein by reference in its entirety including the specification, claims, drawings, and abstract.

TECHNICAL FIELD

The present disclosure relates to a front structure of a vehicle including front side members and an engine compartment cross member.

BACKGROUND

Conventionally, the engine compartment or the front compartment at the front portion of a vehicle includes an engine, a hybrid drive unit, or the like for driving the vehicle. In these years, however, there have been used vehicles having a battery mounted on the underside of the vehicle body floor and having a space at the vehicle front part as a loading space. To improve a front collision coping performance of such a vehicle having the loading space at the front portion, there has been proposed a structure in which an arcuately curved cross bar and a supporting bracket which couples front side members and the cross bar are provided between the front side members (see JP2021-95114A, for example).

To improve impact resistance of a vehicle having a battery and a hydrogen tank on a vehicle body rear part, there is proposed a structure in which an upwardly protruded U-shaped frame is disposed between right and left rear side frames on the vehicle rear side (see JP2010-184574A, for example).

There is also proposed a vehicle front structure in which a pair of front side members at a vehicle front side are connected by an engine compartment cross member which is an annular structure member, a power control unit is mounted on the upper side of the engine compartment cross member, and a motor for driving the vehicle is mounted on the underside of the engine compartment cross member (see JP2020-37310A, for example).

SUMMARY

Meanwhile, the electric motor vehicle is increasing in body weight due to an increase in weight of the battery mounted under the floor or the like. Therefore, a collision energy increases at the time of a front collision, and there is demanded an increase in a collision energy absorption amount. Restraint of an entry distance of a barrier is also demanded.

Accordingly, the present disclosure is to increase an absorption amount of the collision energy while restraining the entry distance of the barrier at the time of the front collision of the vehicle.

The vehicle front structure of the present disclosure is a vehicle front structure comprising a pair of front side members which are provided on both side portions at a vehicle front side and extended in a vehicle longitudinal direction, and an engine compartment cross member which is attached between the pair of front side members, wherein the engine compartment cross member is an annular member including a pair of side members which are respectively attached to the inside surface in a vehicle width direction of the respective front side members and extended in the vehicle longitudinal direction, a front cross member which connects respective front ends of the pair of side members in the vehicle width direction, and a rear cross member which connects respective rear ends of the pair of side members in the vehicle width direction; and the rear cross member is curved to protrude toward a vehicle rear side.

Thus, since the rear cross member is curved to protrude toward the vehicle rear side, rigidity of the engine compartment cross member in the vehicle longitudinal direction can be improved. Accordingly, deformation of the engine compartment cross member at the time of collision is suppressed, a collision load that is input to the engine compartment cross member at the time of front collision is transmitted smoothly toward a rear part of the rear cross member, and the collision load can be transmitted to a portion of dash panel having a higher strength arranged on the rear part of the rear cross member. Thus, the collision energy absorption amount can be increased while restraining the entry distance of the barrier.

In the vehicle front structure of the present disclosure, the rear cross member can include a rear center portion extended in the vehicle width direction and two curved portions which are respectively curved from both end parts of the rear center portion toward the front of the vehicle, and respective tip ends are extended in the direction in which the respective side members are extended and connected to the respective rear ends of the pair of side members.

By the above configuration, the rear cross member has a curved shape continuing to the respective side members, rigidity of the engine compartment cross member in the vehicle longitudinal direction can be further improved, and the collision energy absorption amount can be increased furthermore while further restraining the entry distance of the barrier.

The vehicle front structure according to the present disclosure further comprises a dash panel provided behind the engine compartment cross member at a rear side of the vehicle and configuring a partition from a cabin, and a floor tunnel panel having an upwardly protruded groove-shaped cross section disposed at a center of a floor of the cabin and its front end connected to the dash panel, wherein the groove-shaped cross section of the floor tunnel panel comprises a ceiling panel and a pair of vertical plates to be connected to both side ends of the ceiling panel, the respective curved portions of the rear cross member extend toward the vehicle upper side as they extend toward the vehicle rear side, and the rear center portion and the rear end parts of the curved portions may be located at a height of a ridgeline of the ceiling panel and the vertical plates at the front end of the floor tunnel panel.

Thus, when a front collision occurs, the rear end part of the rear center portion or the curved portions can be contacted to a ridge line at the front end of the floor tunnel panel, and a collision load can be transmitted to the ridge line part of the floor tunnel panel whose strength is high in the vehicle longitudinal direction. Thus, the collision energy absorption amount can be increased while restraining the entry distance of the barrier.

In the vehicle front structure of the present disclosure, the front cross member has a square closed cross-section structure, each side end section is wider toward the vehicle rear side as it extends toward the outer side in the vehicle width direction, and a reinforcing plate can be attached to an inner face of the vehicle rear side.

By the above configuration, the front cross member is suppressed from deforming when a load toward the inside surface in the vehicle width direction is input to the front cross member, and the load can be transmitted smoothly to the front side member on the other side.

In the vehicle front structure of the present disclosure, the respective side members have a square closed cross-section structure combining two crank-like bent plate members, and the respective plate members can be assembled so that flanges for connecting the respective plate members are oriented in an upward or downward direction.

Accordingly, during assembly, a required space can be provided between the respective side members and the respective front side members.

In the vehicle front structure of the present disclosure, the curved portions of the rear cross member can have at least one low strength portion whose strength is lower than other portions.

Accordingly, when the curved portion is contacted to the high strength portion of the dash panel, it is crushed in the vehicle longitudinal direction, so that high voltage equipment mounted on the upper side of the engine compartment cross member is moved toward a vehicle front side relative to the engine compartment cross member. Accordingly, there can be suppressed mutual collision of the high voltage cables and the high voltage equipment arranged between the high voltage equipment and the rear cross member.

In the vehicle front structure of the present disclosure, the front cross member can be arranged at a position overlapping with an inward bending occurrence point of the front side member in the vehicle longitudinal direction upon a front collision.

Accordingly, when one of the front side members has inward bending, a load which is input from the same front side members and directed toward the inner side in the vehicle width direction is transmitted to the other front side member to stop the inward bending of the former front side member, and the former front side member can be subjected to outward bending deformation on the vehicle rear side. Accordingly, bending into three sections of the front side member is realized, and the collision energy can be absorbed efficiently.

In the vehicle front structure of the present disclosure, the inward bending occurrence point of the front side member can be a position where a gusset plate, which connects a crush box attached to a front portion of the front side member on the outer side of the front side member in the vehicle width direction and an outside surface of the front side member in the vehicle width direction, is connected to the front side member.

The present disclosure can increase an absorption amount of collision energy while restraining the entry distance of the barrier when the vehicle has a front collision.

BRIEF DESCRIPTION OF DRAWINGS

Embodiments of the present disclosure will be described based on the following figures, wherein.

DESCRIPTION OF EMBODIMENTS

Figure 1:
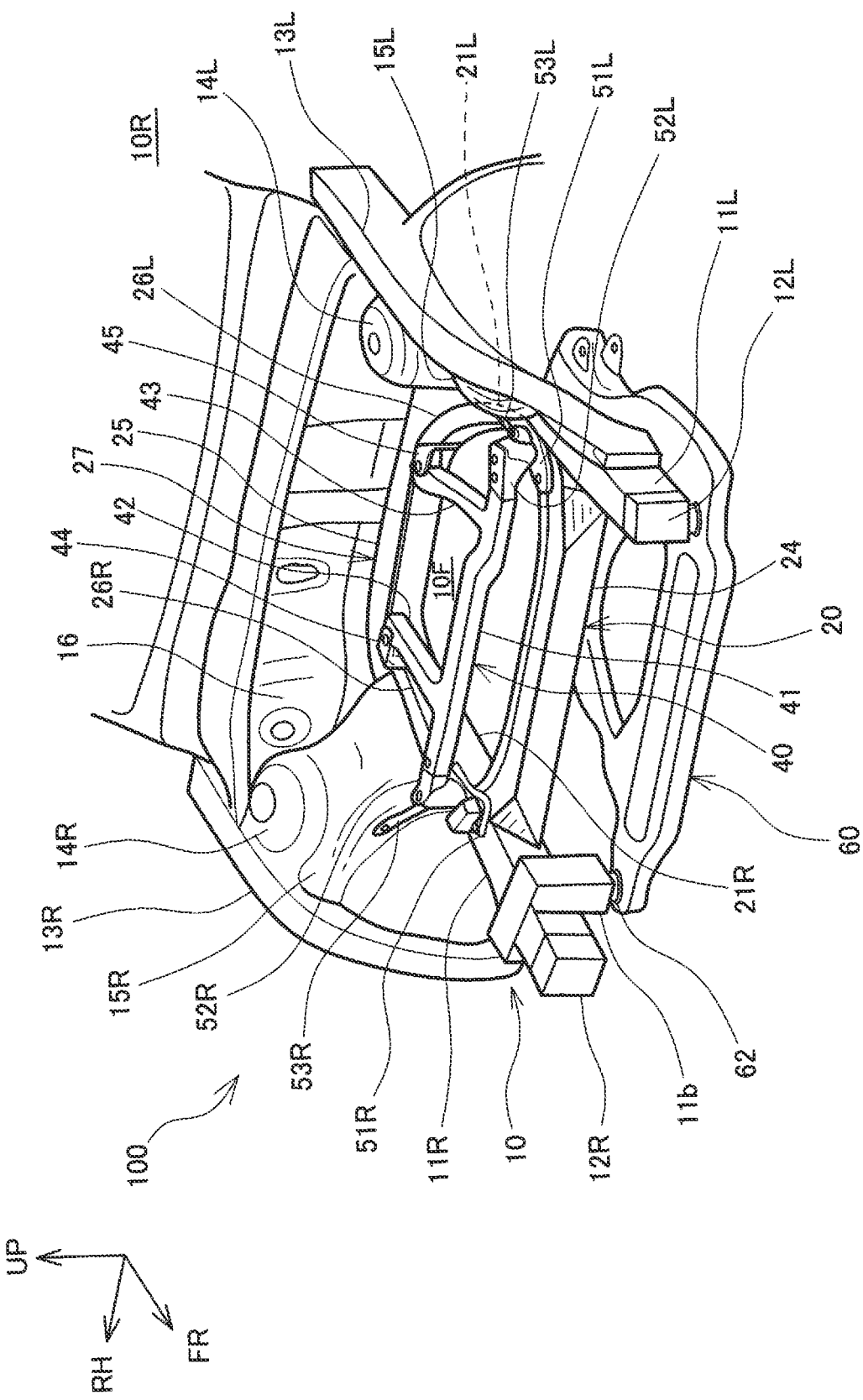
FIG. 1 is a perspective view showing a vehicle front structure of an embodiment.

Referring to the drawings, a vehicle front structure 100 of embodiments will be explained. Arrow FR, arrow UP, and arrow RH shown in the respective drawings respectively indicate a front direction (advancing direction), an upward direction, and a right direction of a vehicle 10. Directions opposite to the respective arrows FR, UP, RH indicate a rear direction, a downward direction, and a left direction of the vehicle. Unless otherwise specifically noted, when explanation is made by simply referring to front/rear, left/right, and up/down directions, they indicate the front and rear in the vehicle longitudinal direction, the right and left in the vehicle lateral direction (vehicle width direction), and the up and down in the vehicle vertical direction, respectively.

As shown in FIG. 1, the vehicle front structure 100 of an embodiment includes a pair of front side members 11L, 11R, an engine compartment cross member 20, a frame 40, brackets 51L, 51R, apron portion connection brackets 53L, 53R, and frame connection brackets 52L, 52R.

Figure 2:
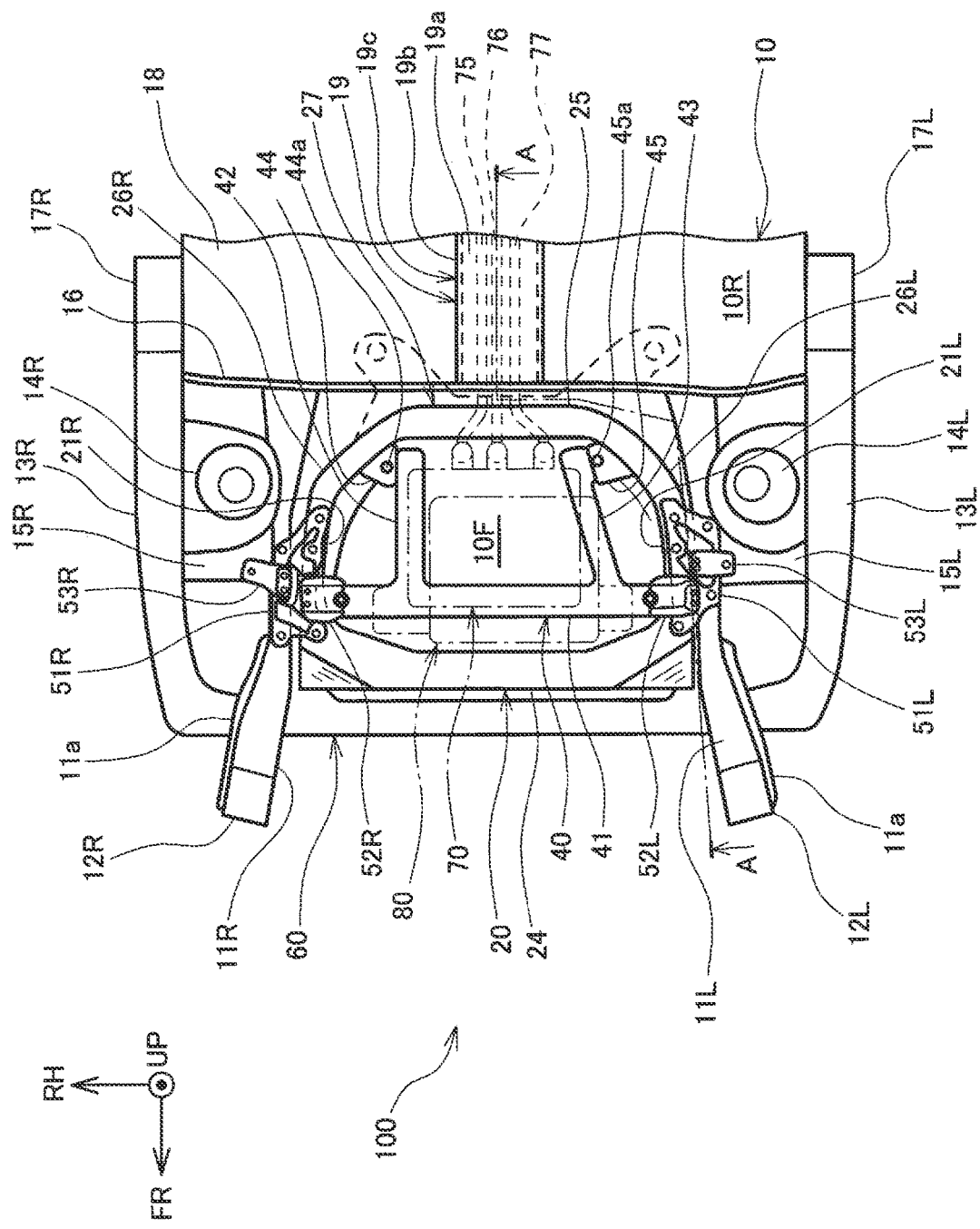
FIG. 2 is a plan view showing the vehicle front structure of the embodiment.
Figure 3:
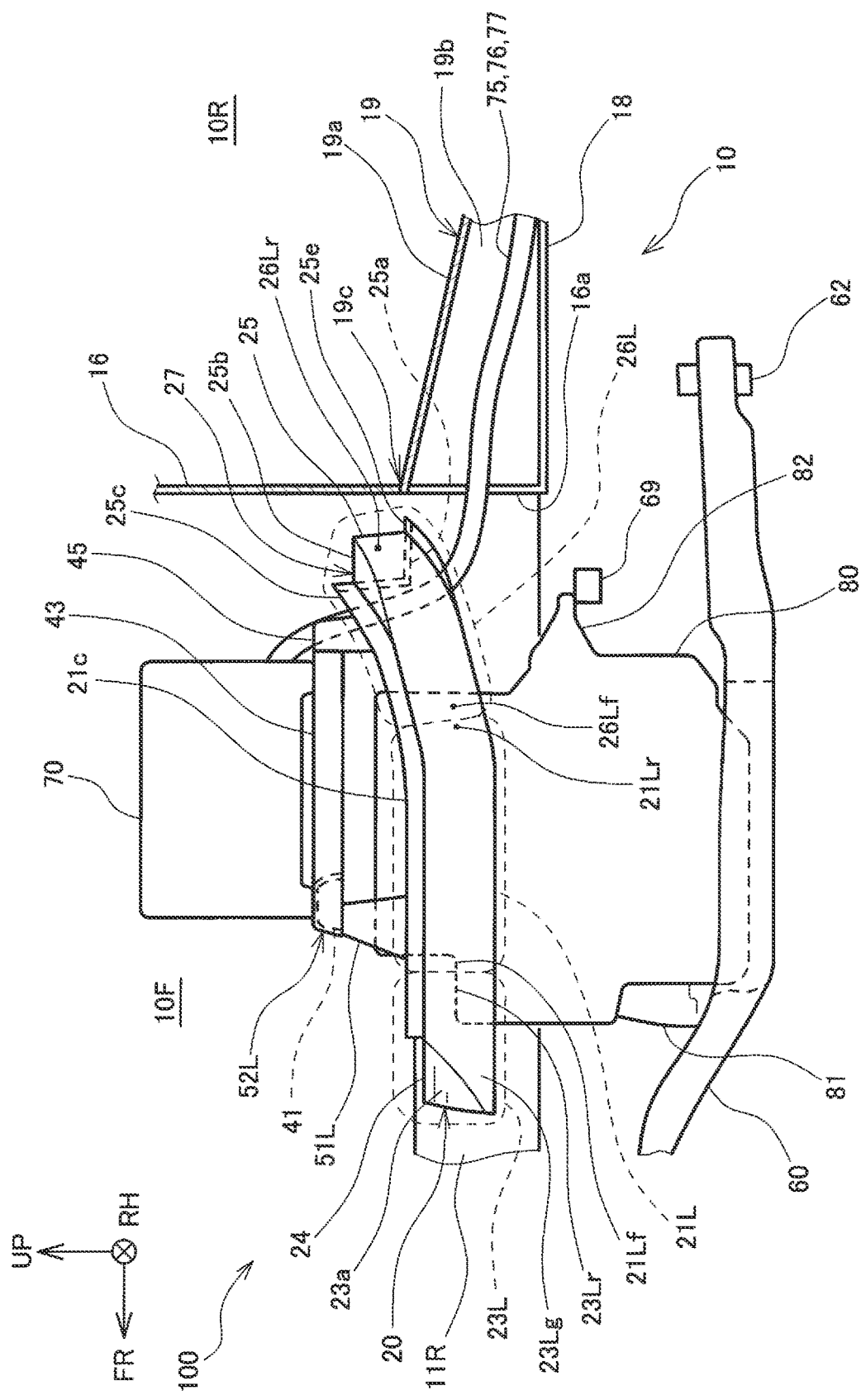
FIG. 3 is a partially sectional side view showing the vehicle front structure of the embodiment, taken along line A-A of FIG. 2.

Referring to FIG. 1 through FIG. 3, the overall structure of a vehicle 10 having the vehicle front structure 100 is explained first. The vehicle 10 is provided with a front compartment 10F which is provided in front of a dash panel 16, and a cabin 10R which is a space provided behind the dash panel 16. FIG. 3 shows that the front compartment 10F houses therein a motor 80 for driving and a power control unit 70 which is high-voltage equipment.

First, a structure of the front compartment 10F is explained. As shown in FIGS. 1 and 2, the front compartment 10F includes the pair of front side members 11L, 11R, a pair of suspension towers 14L, 14R (hereinafter referred to as the suspension towers 14L, 14R), apron portions 15L, 15R, a pair of upper members 13L, 13R, the dash panel 16, and a front suspension member 60 (hereinafter referred to as the suspension member 60). The engine compartment cross member 20 to be explained afterward is mounted between the left and right front side members 11L, 11R, and the frame 40 is mounted on the engine compartment cross member 20.

The front side members 11L, 11R are structure members having a closed cross-section which are provided on both side portions of the front compartment 10F in a front portion of the vehicle 10 and extended in the vehicle longitudinal direction, and their tip ends are respectively mounted with crush boxes 12L, 12R. The respective crush boxes 12L, 12R and the outside surface in the vehicle width direction of the respective front side members 11L, 11R are connected by a gusset plate 11a (see FIG. 2). The suspension towers 14L, 14R are cylindrical structures to which the upper portions of front wheel suspension devices are mounted, and the inside surface in the vehicle width direction is connected to the outside surface in the vehicle with direction of the front side members 11L, 11R. The apron portions 15L, 15R are at the front of the suspension towers 14L, 14R of wheel wells for housing the front wheels and are composed of plate members. The lower end parts of the apron portions 15L, 15R are partially connected to the outsides of the front side members 11L, 11R in the vehicle width direction. The upper members 13L, 13R are reinforcing members which are connected to the outside surfaces in the vehicle width direction of the suspension towers 14L, 14R and the apron portions 15L, 15R and extended in the vehicle longitudinal direction. The front portions of the upper members 13L, 13R are curved toward the vehicle lower part and are also curved toward the inside surface in the vehicle width direction and connected to the outside surface in the vehicle width direction at the front portions of the front side members 11L, 11R. The rear parts of the upper members 13L, 13R are connected to respective front pillars 17L, 17R as shown in FIG. 2. The dash panel 16 is a partition for dividing the front compartment 10F and cabin the 10R. The suspension member 60 is a reinforcing member which is mounted to the underside of the front side members 11L, 11R, and to which the front wheel suspension devices are mounted.

As explained above, the vehicle width direction of the front compartment 10F is defined by the front side members 11L, 11R, the upper members 13L, 13R, the suspension towers 14L, 14R, and the apron portions 15L, 15R; its lower portion is defined by the suspension member 60; its rear part is defined by the dash panel 16; and its front portion is a space which is defined by an unshown radiator support. As shown in FIG. 3, the motor 80 is mounted on the upper side of the suspension member 60. The front portion of the motor 80 is mounted on the suspension member 60 by two front mounts 81, and a rear mount 82 at the rear of the motor 80 is mounted on a support member 69 which is extended in the vehicle width direction within the front compartment 10F.

Moreover, the upper part of the motor 80 is protruded above the upper side of the engine compartment cross member 20 through a space in the inner circumference of the engine compartment cross member 20.

Next, a structure of the cabin 10R is explained below. As shown in FIG. 2, the cabin 10R is provided behind the dash panel 16. The cabin 10R has a floor panel 18 which configures the floor of the cabin 10R, and a floor tunnel panel 19 is provided at a center of the floor panel 18 in the vehicle width direction. The floor tunnel panel 19 has an upwardly protruded groove-shaped cross section which is configured of a ceiling panel 19a and a pair of vertical plates 19b connected to both side end sections of the ceiling panel 19a. The connecting part between the ceiling panel 19a and the vertical plates 19b configures a ridgeline 19c of the groove cross section of the floor tunnel panel 19. As shown in FIG. 3, the front end of the floor tunnel panel 19 is connected to the peripheral edge of a notch portion 16a which is formed on the dash panel 16.

Figure 4:
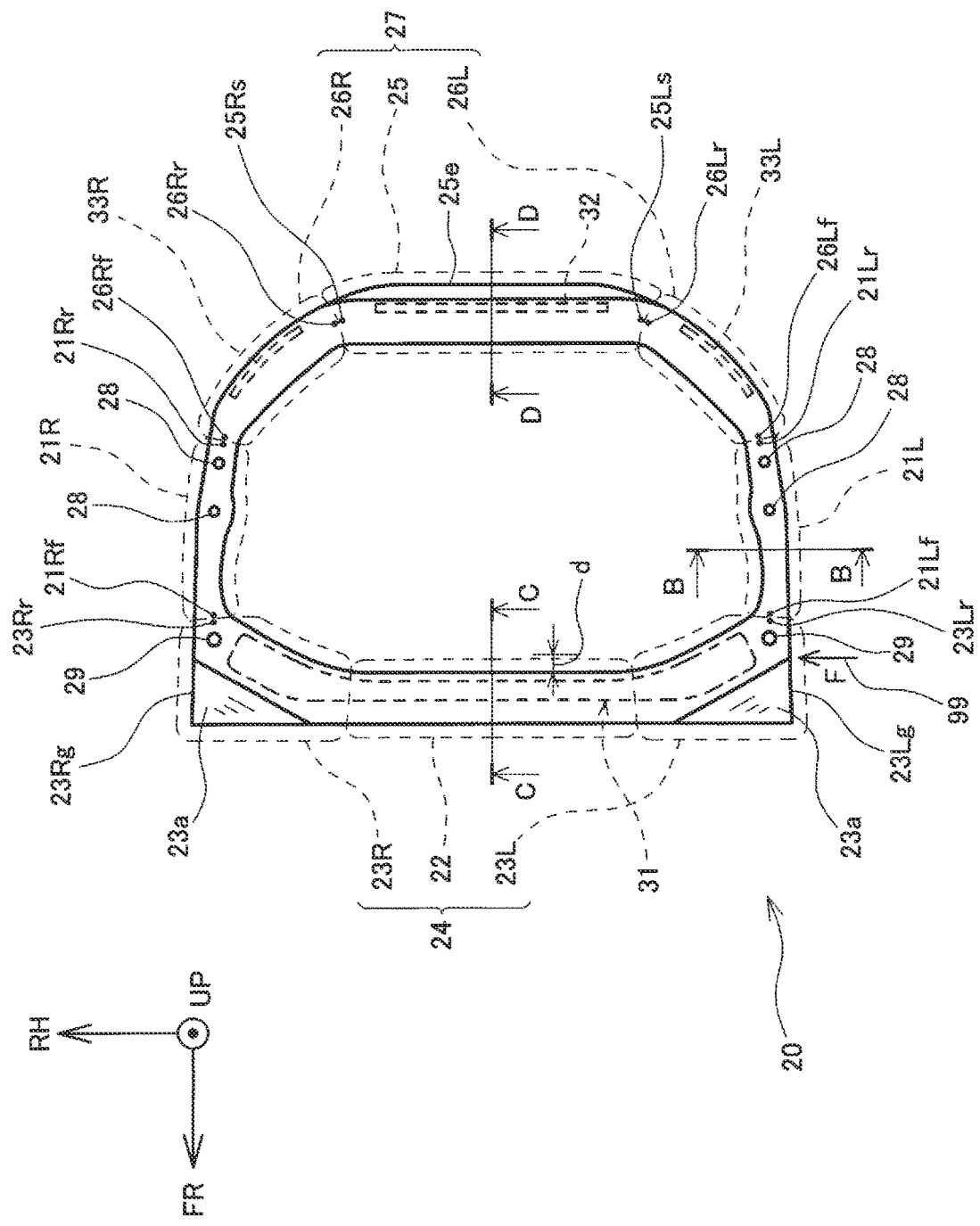
FIG. 4 is a plan view of an engine compartment cross member of the vehicle front structure of the embodiment.

Next, the engine compartment cross member 20 is explained. As shown in FIG. 4, the engine compartment cross member 20 is an annular member which comprises of a pair of left and right side members 21L, 21R, a front cross member 24, and a rear cross member 27. The rear cross member 27 is curved toward the vehicle rear side to form a convex shape so to have a shape of a capital letter D as viewed from above.

Figure 5:
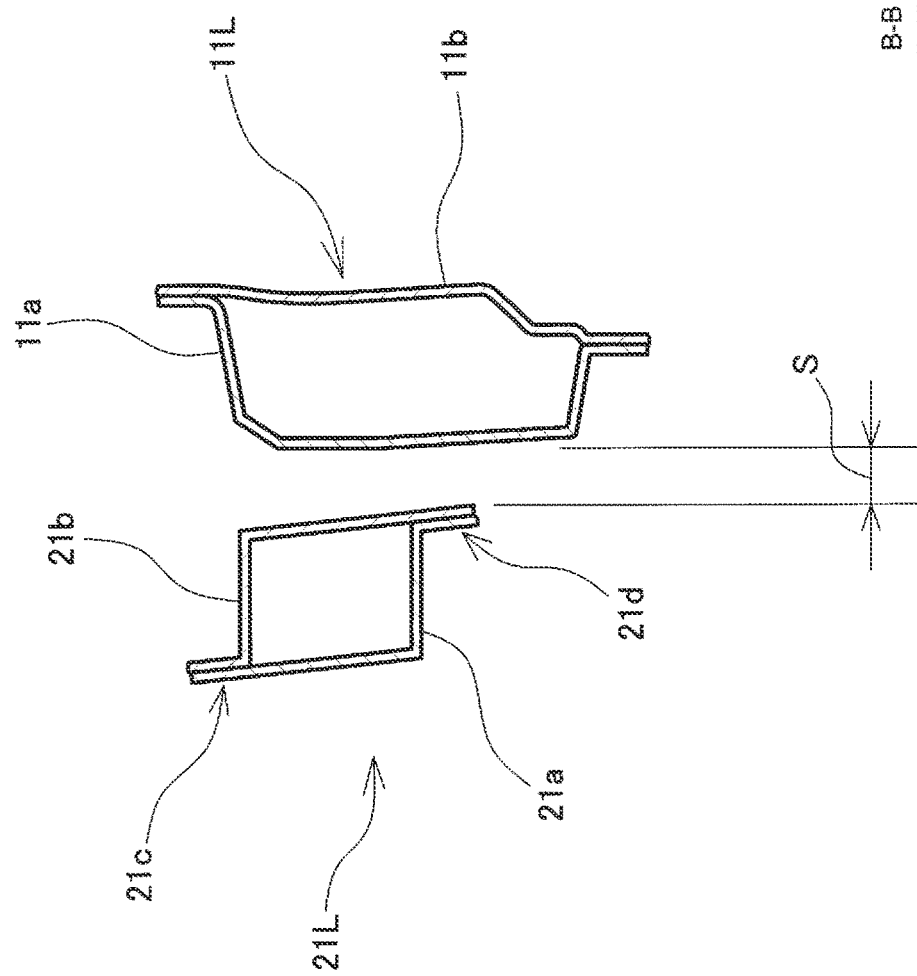
FIG. 5 is a sectional view of a side member of the engine compartment cross member shown in FIG. 4, a sectional view taken along line B-B of FIG. 4, and a sectional view of front side member which is adjacent to the side member.
Figure 5:
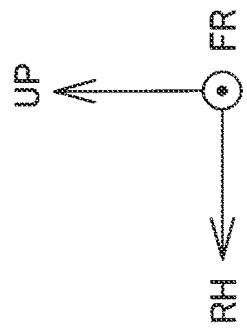

As shown in FIG. 2, the left and right side members 21L, 21R are square closed cross-section members which are respectively attached to the inside surfaces of the left and right front side members 11L, 11R along the inside surface in the vehicle width direction by the brackets 51L, 51R so as to extend respectively in the vehicle longitudinal direction. As shown in FIG. 5, the left side member 21L has a square closed cross-section structure which is formed by combining two crank-like bent plate members 21a, 21b, and the respective plate members 21a, 21b are combined so that flanges 21c, 21d for connecting the respective plate members 21a, 21b are directed in an upward or downward direction. The left side member 21L is arranged to provide a space S between the outside face in the vehicle width direction and the inside face in the vehicle width direction of the left front side member 11L. Since the right front side member 11R and the right side member 21R are symmetrical with the left front side member 11L and the left side member 21L, their explanation will be omitted. In FIG. 4, reference numeral 28 indicates bolt holes where bolts 55 for fixing the brackets 51L, 51R (see FIGS. 9, 10) are respectively inserted.

Figure 6:
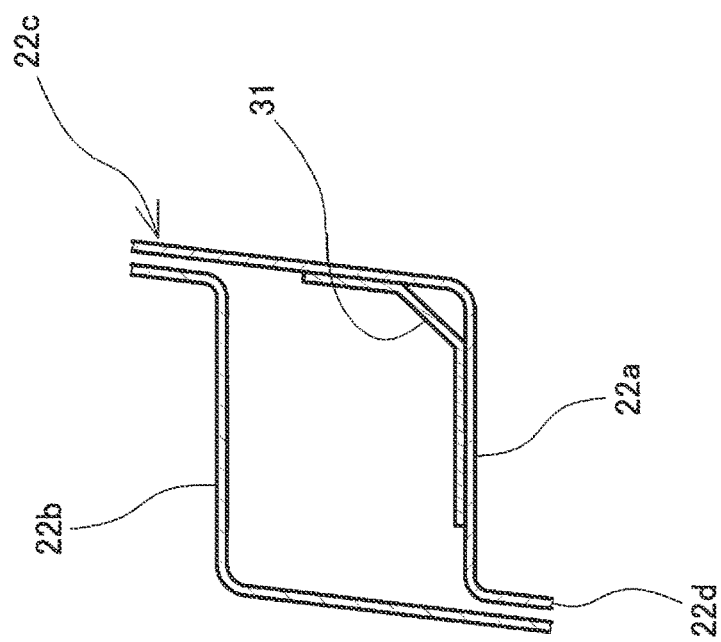
FIG. 6 is a sectional view of a front cross member of the engine compartment cross member shown in FIG. 4; it is a sectional view taken along line C-C of FIG. 4.

As shown in FIG. 4, the front cross member 24 is a member having a square closed cross-section structure for connecting respective front ends 21Lf, 21Rf of the left and right side members 21L, 21R in the vehicle width direction, and configured of a front center portion 22 having a constant cross section, and left and right side end sections 23L, 23R whose width is wider toward the vehicle rear side as it goes toward the outer side in the vehicle width direction. Rear parts 23Lr, 23Rr of the outside in the vehicle width direction of the left and right side end sections 23L, 23R are connected to the respective front ends 21Lf, 21Rf of the left and right side members 21L, 21R. FIG. 6 shows that the front center portion 22 of the front cross member 24 has a square closed cross-section structure combining two crank-like bent plate member 22a, 22b, and the respective plate members 22a, 22b are combined so that flanges 22c, 22d connecting the respective plate members 22a, 22b are directed in the upward or downward direction. The side end sections 23L, 23R also have the same square closed cross-section structure. A reinforcing plate 31 which is bent in a chevron shape is attached to the inner surface on the vehicle rear side and bottom side of the plate member 22a of the front center portion 22. As show in FIG. 4, the reinforcing plate 31 is extended from the front center portion 22 to the insides of the left and right side end sections 23L, 23R. The reinforcing plate 31 arranged within the side end sections 23L, 23R is wider than the reinforcing plate 31 arranged in the front center portion 22.

A slope portion 23a whose upper face height lowers toward the front and outside in the vehicle width direction is provided on the front portion outside in the vehicle width direction of the respective left and right side end sections 23L, 23R. A bolt hole 29 is provided near the rear parts 23Lr, 23Rr of the left and right side end sections 23L, 23R for insertion of a bolt 55 (see FIGS. 9, 10) for fixing the brackets 51L, 51R, and similar to the side members 21L, 21R, the left and right side end sections 23L, 23R are mounted on the left and right front side members 11L, 11R by the brackets 51L, 51R.

As explained afterward, when a left side of the vehicle 10 having the vehicle front structure 100 of the embodiment experiences an offset collision, the left front side member 11L is inwardly bent toward the inner side in the vehicle width direction at an initial stage of the collision. The front cross member 24 is arranged at a position where it overlaps with the inward bending occurrence point of the front side member 11L in the vehicle longitudinal direction, and the inward bent portion of the left front side member 11L strikes against an end face 23Lg of the left side end section 23L of the front cross member 24, and a load F directed toward the inner side in the vehicle width direction at a position indicated by an arrow 99 in FIG. 4 is input to the front cross member 24. The surface of the plate member 22a on the vehicle rear side at the front center portion 22 of the front cross member 24 is arranged to offset toward the vehicle front side by a distance d from the position where the load F is input. When the right side of the vehicle 10 experiences an offset collision, the right front side member 11R is bent inward and strikes against an end face 23Rg of the right side end section 23R of the front cross member 24.

As shown in FIG. 4, the rear cross member 27 comprises a rear center portion 25 extending in the vehicle width direction and two curved portions 26L, 26R connecting left and right end parts 25Ls, 25Rs of the rear center portion 25 and respective rear ends 21Lr, 21Rr of the left and right side members 21L, 21R. The left and right curved portions 26L, 26R are respectively curved from the left and right end parts 25Ls, 25Rs of the rear center portion 25 toward the vehicle front side. Tip ends 26Lf, 26Rf are respectively extended in the directions in which the left and right side members 21L, 21R are extended and respectively connected to the respective rear ends 21Lr, 21Rr of the left and right side members 21L, 21R. Thus, the respective tip ends 26Lf, 26Rf of the respective curved portions 26L, 26R of the rear cross member 27 are continuous to the respective rear ends 21Lr, 21Rr of the respective side members 21L, 21R to form a curved shape in which the rear cross member 27 and the respective side members 21L, 21R are arranged continuously. Thus, rigidity of the engine compartment cross member 20 in the vehicle longitudinal direction can be improved.

Figure 7:
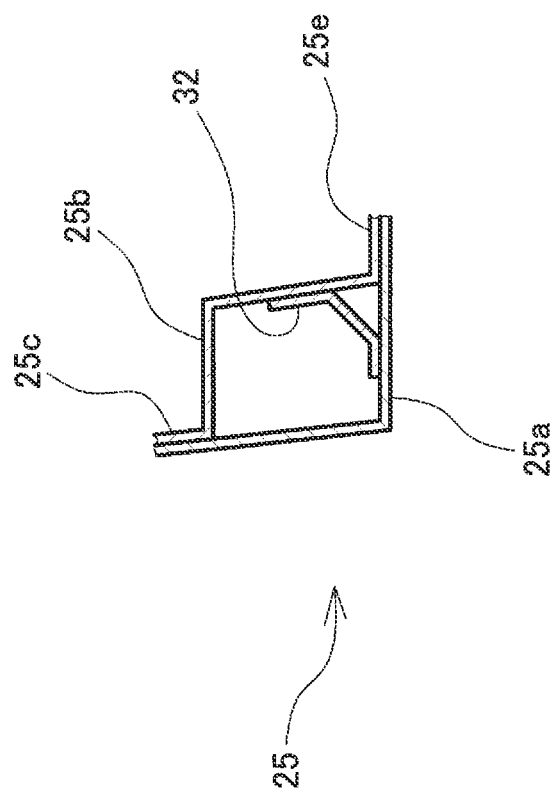
FIG. 7 is a sectional view of a rear cross member of engine compartment cross member shown in FIG. 4; it is a sectional view taken along line D-D of FIG. 4.
Figure 7:
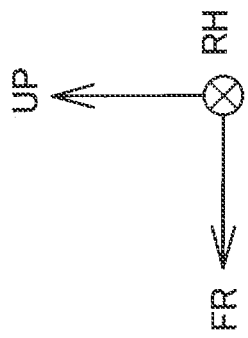

As shown in FIG. 7, the rear center portion 25 of the rear cross member 27 is a square closed cross-section structure combining a plate member 25a which is bent in a chevron shape and a crank-like bent plate member 25b. The plate members 25a, 25b are assembled so that a flange 25c on the vehicle front side for connecting the respective plate members 25a, 25b is extended upward and a flange 25e on the vehicle rear side is extended backward of the vehicle. A reinforcing plate 32 which is bent in a chevron shape is attached to the inner face of the vehicle rear side of the plate member 25b of the rear center portion 25 and the inner face on the lower side of the plate member 25a.

Similar to the side members 21L, 21R explained above, the left and right curved portions 26L, 26R have a square closed cross-section structure that combines two crank-like bent plate members. Reinforcing plates 33L, 33R having a chevron shape similar to the reinforcing plate 31 are attached to the inner face of the center part on the vehicle rear side along the longitudinal direction of the respective curved portions 26L, 26R. Vicinities of rear end parts 26Lr, 26Rr of the curved portions 26L, 26R not provided with the reinforcing plates 33L, 33R and vicinities of the tip ends 26Lf, 26Rf configure a low strength portion whose strength is lower that the portions provided with the reinforcing plates 33L, 33R.

As shown in FIG. 3, the curved portions 26L, 26R of the rear cross member 27 respectively extend toward the vehicle upper side as they extend toward the vehicle rear side, and the rear center portion 25 and the rear end parts 26Lr, 26Rr of the left and right curved portions 26L, 26R are at the same height as the ridge line 19c of the ceiling panel 19a and the vertical plate 19b at the front end of the floor tunnel panel 19. The rear center portion of the rear cross member 27 and the rear end parts 26Lr, 26Rr of the left and right curved portions 26L, 26R can be arranged to overlap the ceiling panel 19a at the front end of the floor tunnel panel 19 as viewed from the vehicle front side.

The frame 40 will be explained next. As shown in FIG. 2, the frame 40 includes a frame cross member 41 extended in the vehicle width direction, and frame members 42, 43 extended from the frame cross member 41 toward the vehicle rear side. FIG. 3 shows that the frame cross member 41 is connected to the upper ends of the respective brackets 51L, 51R by the frame connection brackets 52L, 52R. As shown in FIGS. 2, 3, the frame members 42, 43 are fastened to frame member connection brackets 44, 45 which are respectively provided on the curved portions 26R, 26L of the engine compartment cross member 20 with respective bolts 44a, 45a. The power control unit 70 is mounted on the frame 40. High voltage cables 75, 76, 77 are connected to the power control unit 70 so to connect it to an unillustrated battery. The high voltage cables 75, 76, 77 are routed inside the floor tunnel panel 19 having an upwardly protruded groove-shaped cross section, brought into the front compartment 10F through the notch portion 16a of the dash panel 16, passed through the vehicle front side of the rear center portion 25 of the rear cross member 27, and connected to the terminal of the power control unit 70 which is mounted on the upper side of the frame 40.

Next, explanations will be given on a connection structure of the engine compartment cross member 20, and the left and right front side members 11L, 11R and the left and right apron portions 15L, 15R, and a connection structure of the frame 40 and the engine compartment cross member 20.

Figure 8:
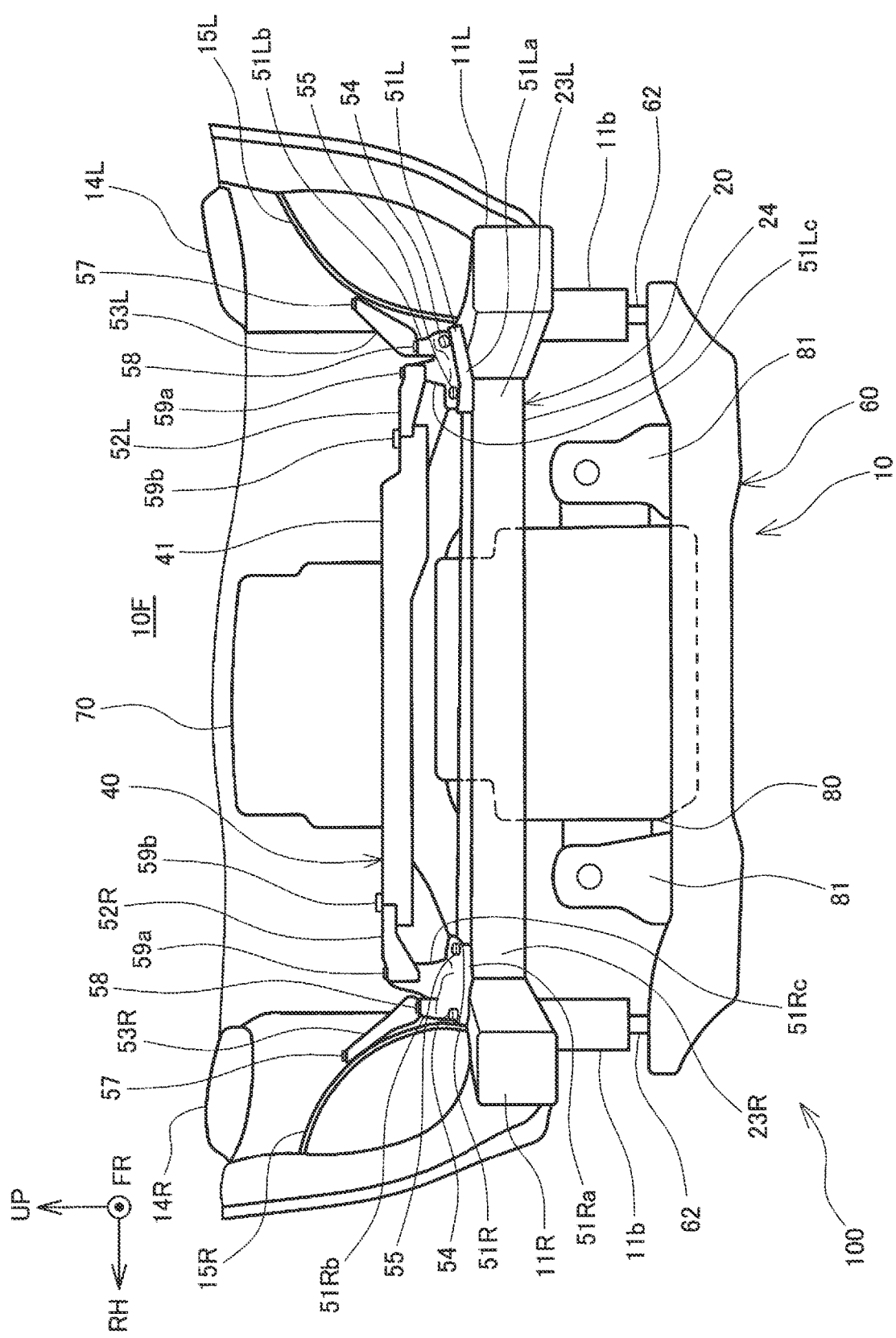
FIG. 8 is an elevation view of a vehicle front structure of the embodiment as viewed from the vehicle front side.
Figure 9:
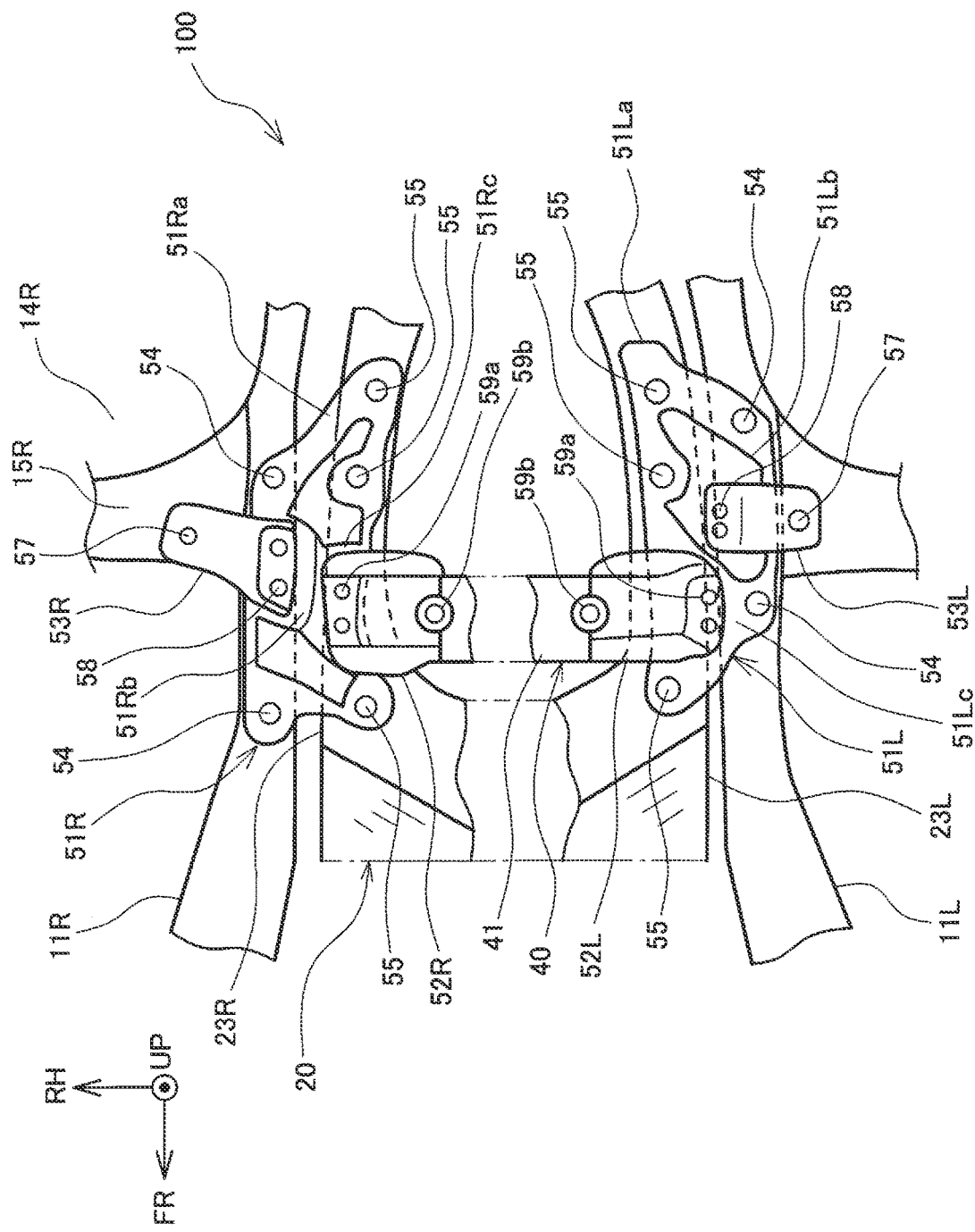
FIG. 9 is an enlarged plan view of a connecting part between an engine compartment cross member and a front side member of the vehicle front structure of the embodiment.

As shown in FIGS. 8 and 9, the left and right side members 21L, 21R of the engine compartment cross member 20 and the left and right side end sections 23L, 23R of the front cross member 24 are respectively connected to the left and right front side members 11L, 11R by the brackets 51L, 51R. The brackets 51L, 51R are provided with approximately trapezoidal plate portions 51La, 51Ra whose inside length in the vehicle width direction is slightly longer than the outside length in the vehicle width direction, and with two projections 51 Lb, 51Lc protruded upward from the plate portion 51La and two projections 51Rb, 51Rc protruded upward from the plate portion 51Ra. The inner sides of the plate portions 51La, 51Ra in the vehicle width direction are attached to the left and right side members 21L, 21R and the left and right side end sections 23L, 23R of the front cross member 24 with three bolts 55. The outer sides of the plate portions 51La, 51Ra in the vehicle width direction are connected to the left and right front side members 11L, 11R with two bolts 54.

The inside end parts in the respective vehicle width directions of the apron portion connection brackets 53L, 53R are connected to the upper ends of projections 51 Lb, 51Rb which are arranged on the outer sides in the vehicle width direction, with two bolts 58. The end parts on the opposite side of the apron portion connection brackets 53L, 53R are connected to the respective apron portions 15L, 15R with bolts 57.

The outer ends in the vehicle width direction of the left and right frame connection brackets 52L, 52R are connected to the upper parts of the projections 51Lc, 51Rc arranged inside in the vehicle width direction, by two bolts 59a. The end parts on the other sides of the frame connection brackets 52L, 52R are connected to the left and right end parts of the frame cross member 41 with bolts 59b.

Figure 10:
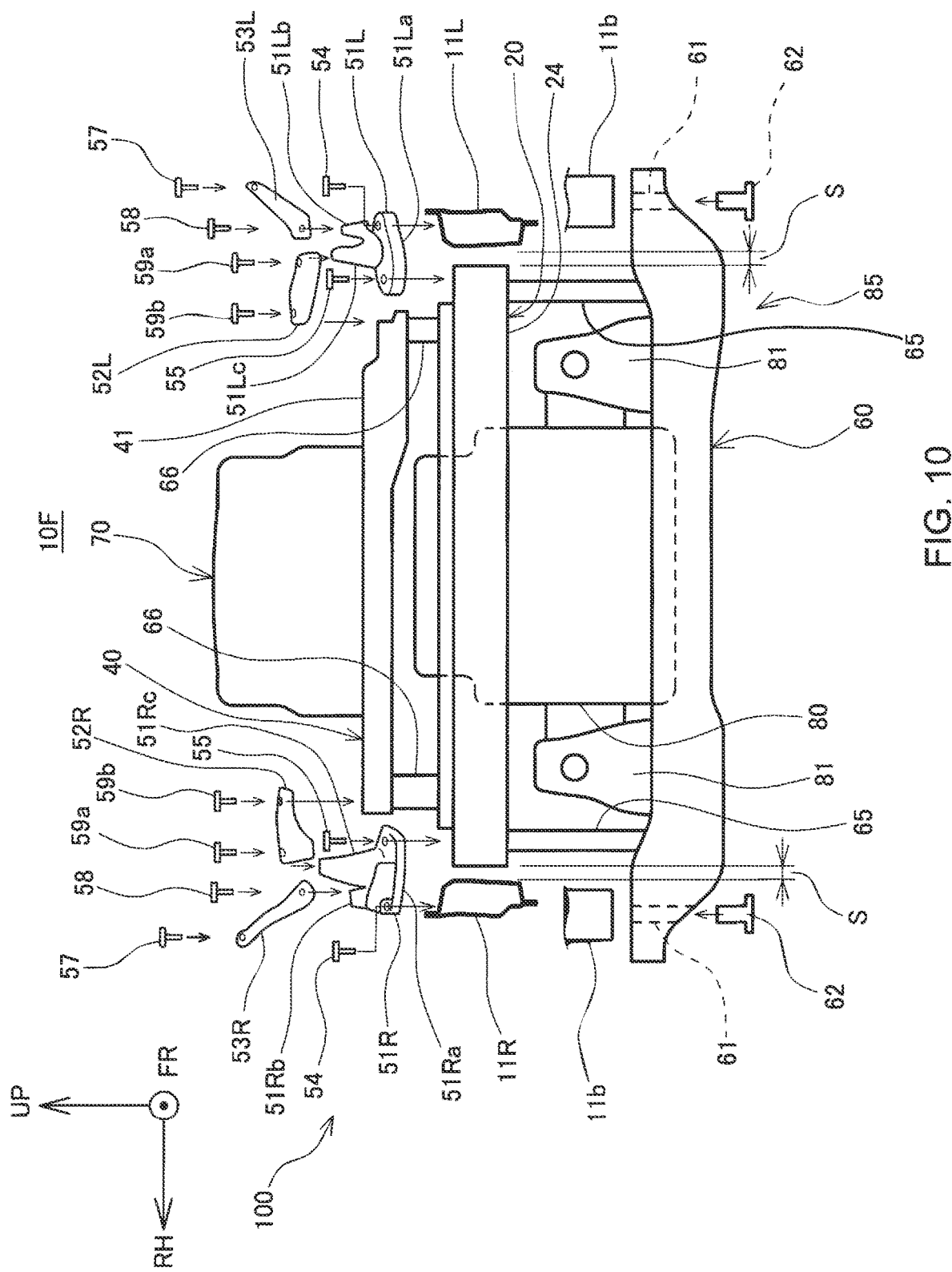
FIG. 10 is an elevation view of the vehicle front structure of the embodiment as viewed from the vehicle front side, and is an explanatory view showing a process of mounting a suspension member, a motor, an engine compartment cross member, and a power control unit into the front compartment of the vehicle front side.

Next, referring to FIG. 10, explanation is given on a process of mounting the motor 80, the power control unit 70, the engine compartment cross member 20, and the suspension member 60 into the front compartment 10F.

As shown in FIG. 10, the motor 80 is mounted on the upper part of the suspension member 60 by the left and right front mounts 81. Next, temporary members 65 are mounted on the suspension member 60, and the engine compartment cross member 20 is mounted on them. Temporary members 66 are mounted on the upper part of the engine compartment cross member 20, and the frame 40 is mounted on them. At this time, the frame members 42, 43 of the frame 40 (see FIG. 2) are attached to the frame member connection brackets 44, 45 which are attached to the engine compartment cross member 20 (see FIG. 2). The power control unit 70 is mounted on the frame 40, and the motor 80, the power control unit 70, the engine compartment cross member 20, the frame 40, and the suspension member 60 are assembled into an integral assembly 85.

Then, the assembly 85 is aligned to provide a space S (see FIG. 5) for assembling between the outside surfaces in the vehicle width direction of the left and right side members 21L, 21R of the engine compartment cross member 20 and the inside surfaces in the vehicle width direction of the left and right front side members 11L, 11R, and the assembly 85 is pushed upward between the left and right front side members 11L, 11R from under the vehicle 10.

After raising the assembly 85 to position the engine compartment cross member 20 at a prescribed height, the plate portions 51La, 51Ra of the brackets 51L, 51R are aligned from above with the upper surfaces of the front side members 11L, 11R, the side members 21L, 21R, and the left and right side end sections 23L, 23R of the front cross member 24. Bolts 54, 55 are inserted from above, and the plate portions 51La, 51Ra are fastened to the left and right front side members 11L, 11R, the left and right side members 21L, 21R, and the left and right side end sections 23L, 23R with the bolts 54, 55. Tightening members 62 are each inserted into suspension member bores 61 from under the suspension member 60 to fasten the suspension member 60 to suspension member supports 11b extended to the lower sides of the front side members 11L, 11R.

Then, the apron portion connection brackets 53L, 53R are aligned from above with the upper surfaces of the apron portions 15L, 15R and the upper parts of the projections 51 Lb, 51Rb. Bolts 57, 58 are inserted from above, and the apron portion connection brackets 53L, 53R are fastened to the upper surfaces of the apron portions 15L, 15R and the upper parts of the projections 51 Lb, 51Rb with the bolts 57, 58. The frame connection brackets 52L, 52R are connected to the upper ends of the projections 51Lc, 51Rc and the left and right end parts of the frame cross member 41 with bolts 59a, 59b from above.

The assembly 85 is attached to the left and right front side members 11L, 11R, the suspension member 60, and the apron portions 15L, 15R, and the temporary members 65, 66 are removed. Thus, in the vehicle front structure 100 of the embodiment, the assembly 85 of the motor 80, the power control unit 70, the engine compartment cross member 20, the frame 40, and suspension member 60 can be integrally assembled from the lower side of the vehicle 10.

Figure 11:
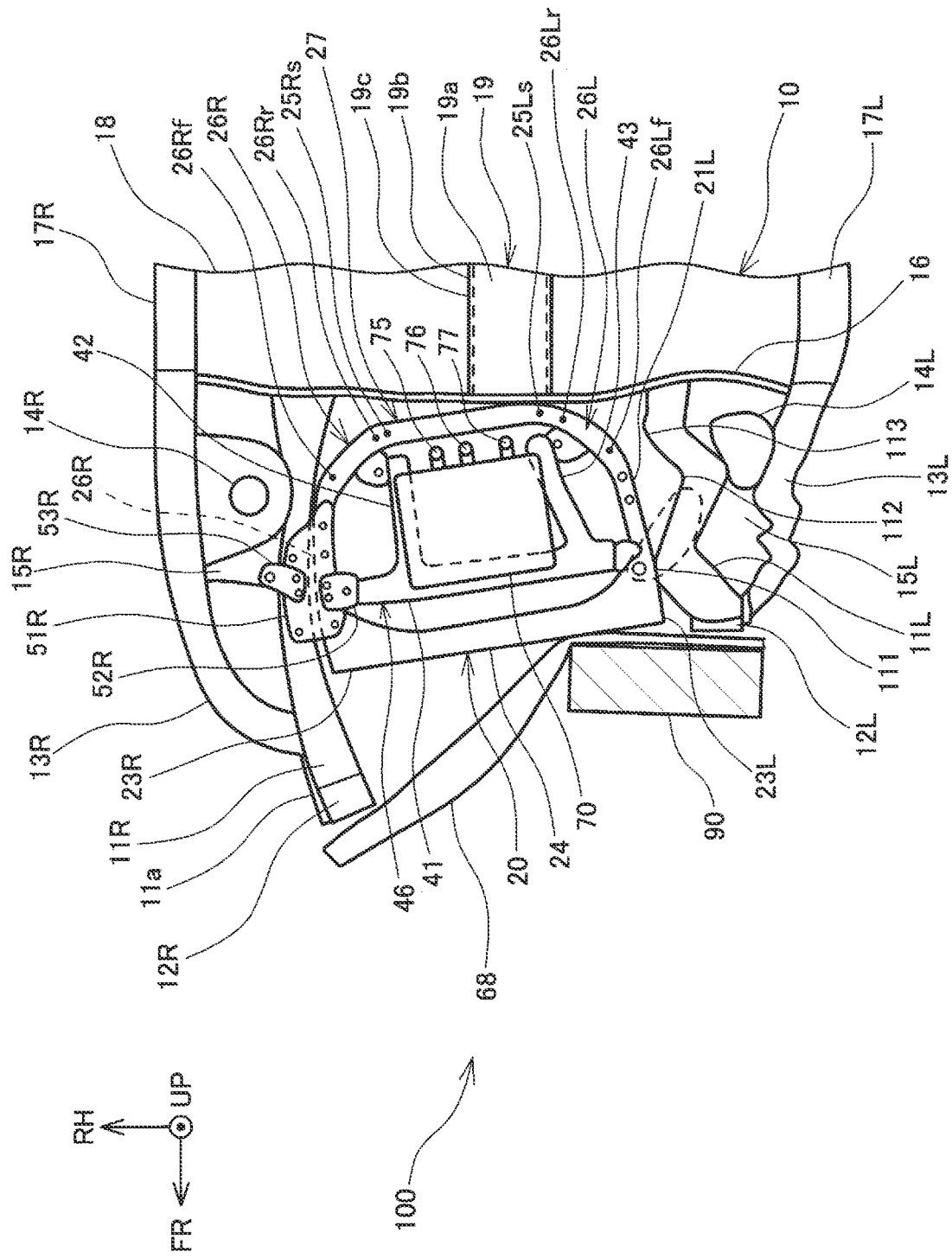
FIG. 11 is a plan view showing that the vehicle front structure is deformed when a vehicle having the vehicle front structure of the embodiment experiences an offset collision on its left side.
Figure 12:
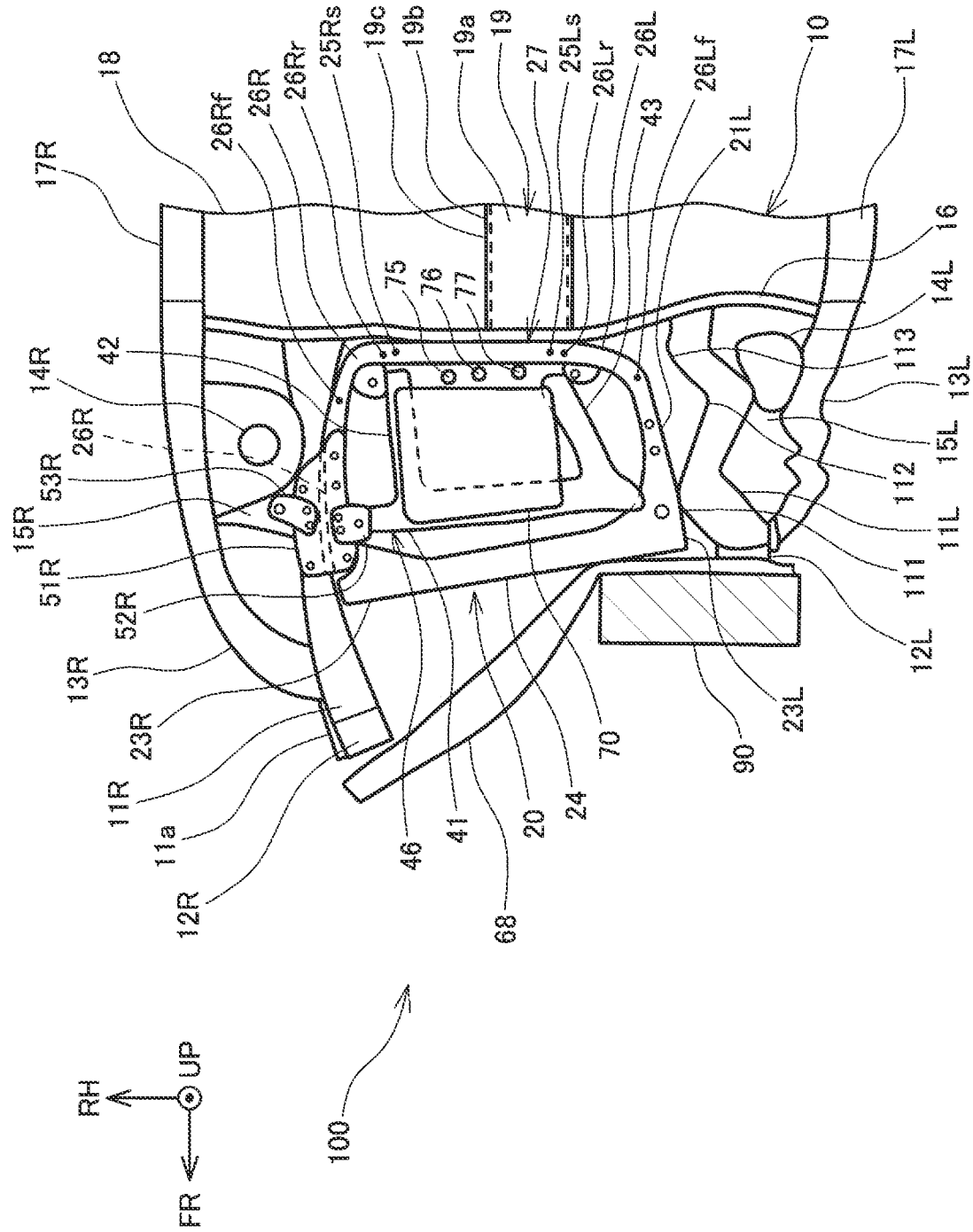
FIG. 12 is a plan view showing deformation of the vehicle front structure upon an offset collision to the left side of a vehicle having the vehicle front structure of the embodiment and the barrier has entered further than in the state shown in FIG. 11.
Figure 13:
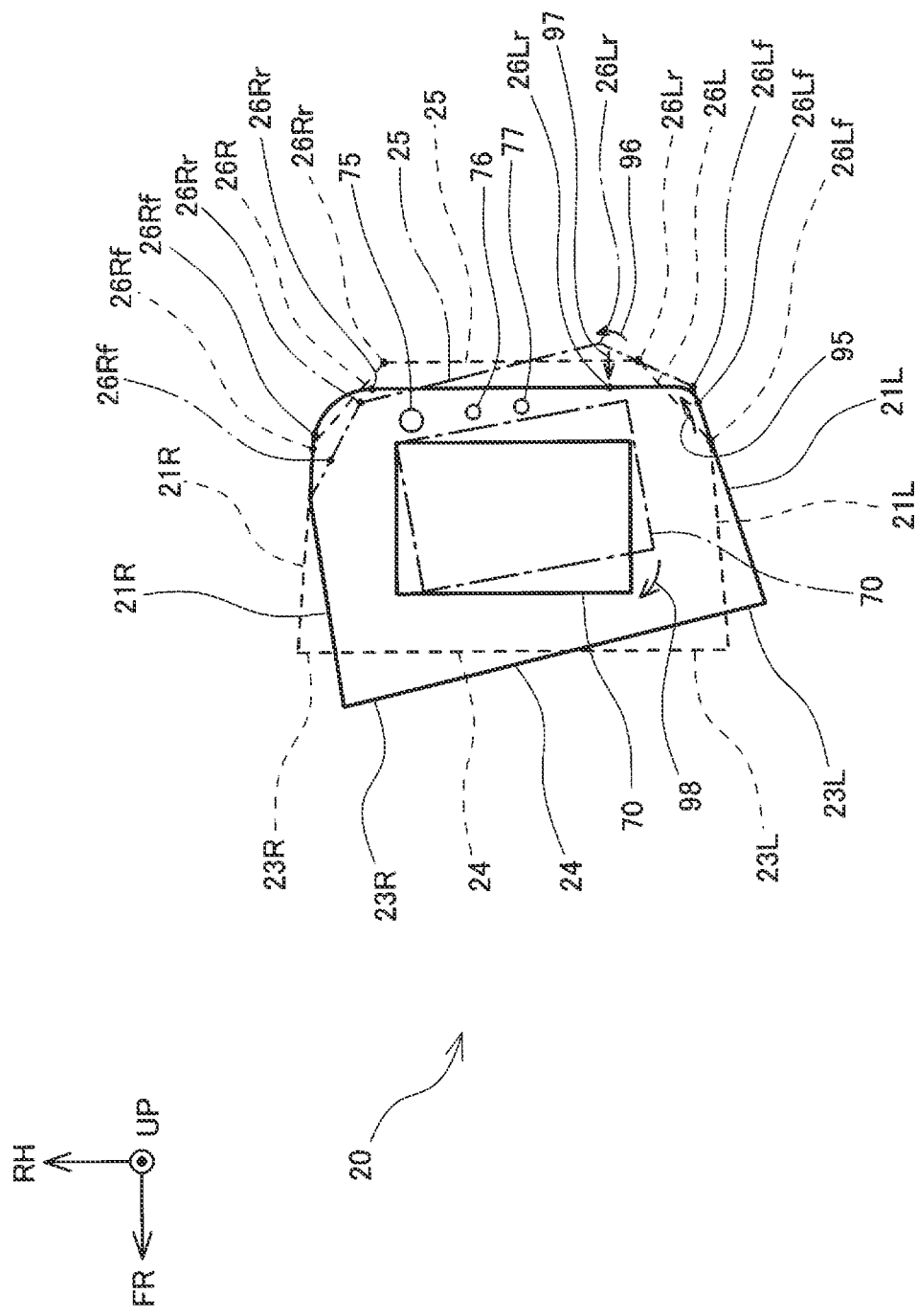
FIG. 13 is a plan view schematically showing deformation of the engine compartment cross member and movement of the power control unit upon an offset collision to the left side of a vehicle having the vehicle front structure of the embodiment had.

Referring to FIG. 11 to FIG. 13, deformation of each portion is explained by assuming offset collision of the left side of the vehicle 10 having the vehicle front structure 100 of the embodiment. In the following explanation, the offset collision is a head-on collision in which an aluminum honeycomb barrier 90 collides with a 40% portion in the vehicle width direction.

First, the barrier 90 hits a bumper reinforcement 68 which is attached to the front of the left and right front side members 11L, 11R via the crush boxes 12L, 12R. The bumper reinforcement 68 is bent by following the shape of the barrier 90. At this time, the left side portion of the bumper reinforcement 68 receives a large backward collision load, and the left crush box 12L which is arranged behind it is plastically deformed in a compression direction and absorbs the impact. The impact load is transmitted from the left crush box 12L to the front end of the left front side member 11L.

The left front side member 11L receives a backward impact load and also receives the input of the load directed toward inside in the vehicle width direction from the left crush box 12L through the left gusset plate 11a. Therefore, when the left front side member 11L is bent inward at a position 111 where the left gusset plate 11a is connected to the left front side member 11L, it simultaneously receives a backward load and is bent inward. Accordingly, the position 111 becomes an inward bending occurrence point where the left front side member 11L is bent inward.

When the left front side member 11L is bent inward, the inward bent portion strikes against the end face 23Lg of the left side end section 23L of the front cross member 24, and the load F directed toward the inner side in the vehicle width direction is input to the left side end section 23L as explained by reference to FIG. 4. This load F is transmitted by the front cross member 24 to the opposite right front side member 11R. Accordingly, the inward bending of the left front side member 11L is stopped, and the left front side member 11L is bent outward at a point 112 and bent inward again at a point 113 to deform into three sections.

As explained above, when the left front side member 11L is deformed into three sections, the left side of the engine compartment cross member 20 is moved toward the vehicle rear side. On the other hand, the right front side member 11R does not move much from the original position, and the right side of the engine compartment cross member 20 does not move backward much. Therefore, the engine compartment cross member 20 is turned to move back the left side toward the vehicle rear side, and the left end part 25Ls of the rear center portion 25 and a vicinity of the rear end part 26Lr of the left curved portion 26L come into contact with the dash panel 16. The front end of the floor tunnel panel 19 is connected to the cabin 10R side of the dash panel 16. Therefore, the left end part 25Ls of the rear center portion 25 and the vicinity of the rear end part 26Lr of the left curved portion 26L are located near the ridge line 19c which is a connecting part between the ceiling panel 19a of the floor tunnel panel 19 and the left vertical plate 19b as viewed from above. As explained with reference to FIG. 3, the left end part 25Ls of the rear center portion 25 and the rear end part 26Lr of the left curved portion 26L are located at the height of the ridgeline 19c of the floor tunnel panel 19. Therefore, the left end part 25Ls of the rear center portion and the vicinity of the rear end part 26Lr of the left curved portion 26L are located at the front end of the ridgeline 19c of the floor tunnel panel 19 as viewed from a side. Therefore, the rear center portion 25 of the rear cross member 27 and the rear end part 26Lr of the left curved portion 26L come into contact with the dash panel 16 which is located at the front end of the ridgeline 19c of the floor tunnel panel 19 to transmit a collision load to the ridgeline 19c of the floor tunnel panel 19.

In this state, the engine compartment cross member 20 is turned from the initial state indicated by a broken line in FIG. 13 so that the left side is moved backward to the vehicle rear side as indicated by arrows 95, 96, but a D-shaped planar shape in a top view is not changed as indicated by the dot-and-dash line in FIG. 13. Thus, there is no change in a relative position relation between the engine compartment cross member 20 and the frame 40, a relative position relation between the engine compartment cross member 20 and the power control unit 70 which is mounted on the frame 40, and a relative position relation between the rear cross member 27 and the high voltage cables 75 to 77 passing vertically between the power control unit 70 and the rear cross member 27. Therefore, the high voltage cables 75 to 77 are located in the space between the rear cross member 27 and the power control unit 70 and do not come into contact with the engine compartment cross member 20 and the power control unit 70.

When the barrier 90 further advances from the state shown in FIG. 11, the load in the vehicle longitudinal direction applied to the left end part 25Ls of the rear center portion 25 and the rear end part 26Lr of the left curved portion 26L is increased. Accordingly, the left end part 25Ls of the rear center portion 25 and the rear end part 26Lr of the left curved portion 26L receive a large reaction force, which is directed toward the vehicle front side, from the ridgeline 19c of the floor tunnel panel 19 having high strength. Thus, as shown in FIG. 12 and indicated by the solid line and arrow 97 in FIG. 13, the left end part 25Ls of the rear center portion 25 and the rear end part 26Lr of the left curved portion 26L are deformed to crush toward the vehicle front side. As explained above with reference to FIG. 4, this occurs because the vicinity of the rear end part 26Lr and the vicinity of the tip end 26Lf of the curved portion 26L are low strength portions which are not provided with the reinforcing plate 33L, and the vicinity of the rear end part 26Lr and the vicinity of the tip end 26Lf have a small bending radius and are easily deformed.

Due to the above deformation, as shown in FIG. 12 and as indicated by the solid line and arrow 98 in FIG. 13, the frame 40 is deformed against the engine compartment cross member 20, the left side of the power control unit 70 is turned to move toward the vehicle front side, and the left side of the power control unit 70 is moved toward the front relative to the engine compartment cross member 20. Accordingly, the space where the high voltage cables 75 to 77 are passed vertically remains among the rear center portion 25, the left curved portion 26, and the power control unit 70, and the high voltage cables 75 to 77 can be kept in a state not to come into contact with the engine compartment cross member 20 and the power control unit 70.

As explained above, deformation is caused when the left side of the vehicle 10 experiences an offset collision. When the right side of the vehicle 10 experiences an offset collision, its deformation is symmetrical with the deformation caused when the left side of the vehicle 10 experiences the offset collision, so that its explanation will be omitted.

As explained above, in the vehicle front structure 100 of the embodiment, rigidity of the engine compartment cross member 20 in the vehicle longitudinal direction can be improved by curving the rear cross member 27 to protrude toward the vehicle rear side. Especially, the respective tip ends 26Lf, 26Rf of the respective curved portions 26L, 26R of the rear cross member 27 and the respective rear ends 21Lr, 21Rr of the respective side members 21L, 21R are continued to form a curved continued shape of the rear cross member 27 and the respective side members 21L, 21R. Accordingly, the rigidity of the engine compartment cross member 20 in the vehicle longitudinal direction can be improved furthermore. Thus, the engine compartment cross member 20 is suppressed from being deformed by the collision load input to the engine compartment cross member 20 upon the front collision, and the collision load can be transmitted smoothly from the rear cross member 27 to the rear member.

Figure 14:
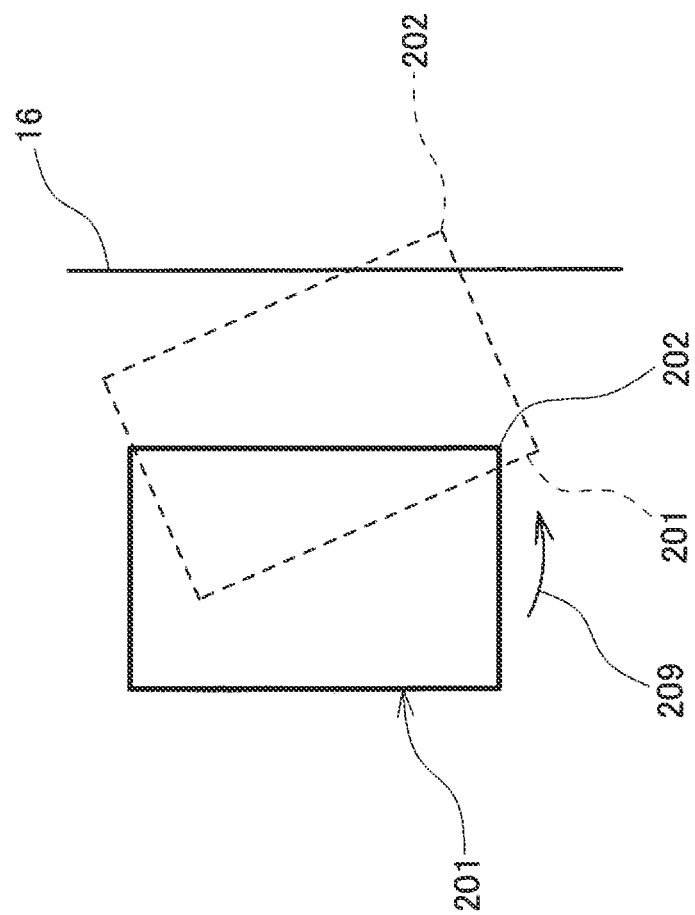
FIG. 14 is a plan view schematically showing that the engine compartment cross member is moved backward when the left side of a vehicle having the engine compartment cross member of a comparative example experiences an offset collision.

Moreover, when the vehicle 10 experiences the left side offset collision, the engine compartment cross member 20 is turned, and the vicinity of the left end part 25Ls of the rear center portion 25 and the vicinity of the rear end part 26Lr of the left curved portion 26L collide with the dash panel 16. Thus, the curved portion collides with the dash panel 16, and the dash panel 16 can be suppressed from being damaged different from a comparative example shown in FIG. 14 in which the dash panel 16 is damaged by a corner portion 202 of an engine compartment cross member 201 coming into collision with the dash panel 16. In FIG. 14, the solid line indicates the engine compartment cross member 201 before the offset collision, the broken line indicates the engine compartment cross member 201 at the time of the offset collision, and the arrow 209 indicates a backward movement of the engine compartment cross member 201 at the time of offset collision.

Further, deformation of the engine compartment cross member 20 can be suppressed by curving the rear cross member 27 so to project it backward, so that in the initial state when the engine compartment cross member 20 experiences an offset collision with the dash panel 16, a relative position of the engine compartment cross member 20, the power control unit 70, and the high voltage cables 75 to 77 is not varied, and the high voltage cables 75 to 77 can be suppressed from contacting the engine compartment cross member 20 and the power control unit 70.

The vehicle front structure 100 of the embodiment is configured so that the respective curved portions 26L, 26R of the rear cross member 27 extend toward the vehicle upper side as they extend toward the vehicle rear side, and the height positions of the rear center portion of the rear cross member 27 and the respective rear end parts 26Lr, 26Rr of the respective curved portions 26L, 26R are the same as the height of the ridgeline 19c at the front end of the floor tunnel panel 19. Therefore, when the offset collision occurs, the collision load can be transmitted from the engine compartment cross member 20 to the ridgeline 19c of the floor tunnel panel 19 having high strength, and the collision energy absorption amount can be increased while restraining the entry distance of the barrier 90.

In the vehicle front structure 100 of the embodiment, the front cross member 24 is configured of the front center portion 22 having a prescribed width, and the left and right side end sections 23L, 23R whose width is wider in the vehicle width direction toward the vehicle rear side, and has therein the reinforcing plate 31. Accordingly, even when the vehicle rear side face of the front center portion 22 is offset toward the vehicle front side by a distance d from a position in the vehicle longitudinal direction of the load F input to the front cross member 24 from the left side at the time of offset collision of the vehicle left side, the front cross member 24 is suppressed from being deformed by the input load F, and the load F can be smoothly transmitted to the right front side member 11R on the opposite side.

Thus, the left front side member 11L can be deformed into three sections to absorb the impact energy. Since the vehicle rear side face of the front center portion 22 is offset toward the vehicle front side by the distance d, the inner circumferential dimension of the engine compartment cross member 20 can be increased. Since the motor 80 mounted on the suspension member 60 has its top part project above the engine compartment cross member through the space in the inner periphery of the engine compartment cross member 20, the motor 80 having a large size can be mounted on the suspension member 60 by increasing the inner circumferential dimension of the engine compartment cross member 20.

Furthermore, in the vehicle front structure 100 of the embodiment, the left and right side members 21L, 21R have a square closed cross-section structure combining two crank-like bent plate members 21a, 21b, and the respective plate members 21a, 21b are combined to arrange the respective flanges 21c, 21d for connecting the respective plate members 21a, 21b and are directed in the upward or downward direction. Therefore, a space S required during assembly can be provided between the left and right side members 21L, 21R and the left and right front side members 11L, 11R, and the assembly 85 of the motor 80, the power control unit 70, the engine compartment cross member 20, the frame 40 and suspension member 60 can be integrally assembled from under the vehicle 10. Thus, the assembly 85 can be mounted in a short time. Moreover, it becomes possible to use a facility for mounting an engine of an engine vehicle from under the vehicle, and investment for a new facility is not needed.

In the vehicle front structure 100 of the embodiment, the respective tip ends 26Lf, 26Rf and the respective rear end parts 26Lr, 26Rr of the respective curved portions 26L, 26R of the rear cross member 27 configure a low strength portion whose strength is lower than other portions. Therefore, when the left curved portion 26L receives a large reaction force from the front end part of the ridgeline 19c of the floor tunnel panel 19 in the later stage of the left side offset collision of the vehicle 10, the left curved portion 26L is crushed in the vehicle longitudinal direction, and the left side of the power control unit 70 is moved toward the vehicle front side relative to the engine compartment cross member 20. Accordingly, the high voltage cables 75 to 77 arranged between the power control unit 70 and the rear cross member 27 can be suppressed from contacting the power control unit 70 or the rear cross member 27.

In the vehicle front structure 100 of the embodiment, it was explained that the respective curved portions 26L, 26R have two low strength portions. In addition, for example, it may be the case that only the respective rear end parts 26Lr, 26Rr are determined as a low strength portion.

As explained above, when the vehicle 10 experiences a front collision, the vehicle front structure 100 of the embodiment restrains the entry distance of the barrier 90 and can increase the collision energy absorption amount.

The invention claimed is:

1. A vehicle front structure, comprising:
a pair of front side members which are provided on both side portions at a vehicle front side and extended in a vehicle longitudinal direction, and
an engine compartment cross member which is attached between the pair of front side members, wherein:
the engine compartment cross member is an annular member including:
a pair of side members which are respectively attached to the inside surface in a vehicle width direction of the respective front side members and extended in the vehicle longitudinal direction,
a front cross member which connects respective front ends of the pair of side members in the vehicle width direction, the front cross member having a square closed cross-section structure, the front cross member having side end sections, each side end section being wider toward a vehicle rear side as it extends toward an outer side in the vehicle width direction,
a reinforcing plate attached to an inner face of the front cross member on the vehicle rear side, and
a rear cross member which connects respective rear ends of the pair of side members in the vehicle width direction,
the rear cross member being curved to protrude toward the vehicle rear side.

2. The vehicle front structure according to claim 1, wherein:
the rear cross member includes:
a rear center portion extended in the vehicle width direction; and
two curved portions which are respectively curved from both end parts of the rear center portion toward the front of a vehicle; and respective tip ends are extended in the directions that the respective side members are extended and connected to the respective rear ends of the pair of side members.

3. The vehicle front structure according to claim 2, wherein:
the respective side members have a square closed cross-section structure combining two crank-like bent plate members, and the respective plate members are assembled so that flanges for connecting the respective plate members are oriented in an upward or downward direction.

4. The vehicle front structure according to claim 2, wherein:
the curved portions of the rear cross member have at least one low strength portion whose strength is lower than other portions of the curved portions of the rear cross member.

5. The vehicle front structure according to claim 2, further comprising:

a dash panel provided behind the engine compartment cross member toward the vehicle rear side and configuring a partition from a cabin, and a floor tunnel panel having an upwardly protruded groove-shaped cross section disposed at a center of a floor of the cabin and its front end connected to the dash panel, wherein:

the groove-shaped cross section of the floor tunnel panel comprises a ceiling panel and a pair of vertical plates to be connected to both side ends of the ceiling panel;

the respective curved portions of the rear cross member extend toward the vehicle upper side as they extend toward the vehicle rear side; and the rear center portion and the rear end parts of the two curved portions are located at a height of a ridgeline of the ceiling panel and the vertical plates at the front end of the floor tunnel panel.

6. The vehicle front structure according to claim 5, wherein:

the respective side members have a square closed cross-section structure combining two crank-like bent plate members, and the respective plate members are assembled so that flanges for connecting the respective plate members are oriented in an upward or downward direction.

7. The vehicle front structure according to claim 5, wherein:

the curved portions of the rear cross member have at least one low strength portion whose strength is lower than other portions of the curved portions of the rear cross member.

8. The vehicle front structure according to claim 5, wherein:

the front cross member is arranged at a position overlapping with an inward bending occurrence point of the front side member in the vehicle longitudinal direction in a front collision state corresponding to a front collision to the vehicle front structure.

9. The vehicle front structure according to claim 8, wherein:

the inward bending occurrence point of the front side member is a position where a gusset plate, which connects a crush box attached to a front portion of the front side member on an outer side of the front side member in the vehicle width direction and an outside surface of the front side member in the vehicle width direction, is connected to the front side member.

10. The vehicle front structure according to claim 2, wherein:

the front cross member is arranged at a position overlapping with an inward bending occurrence point of the front side member in the vehicle longitudinal direction in a front collision state corresponding to a front collision to the vehicle front structure.

11. The vehicle front structure according to claim 10, wherein:

the inward bending occurrence point of the front side member is a position where a gusset plate, which connects a crush box attached to a front portion of the front side member on an outer side of the front side member in the vehicle width direction and an outside surface of the front side member in the vehicle width direction, is connected to the front side member.

12. The vehicle front structure according to claim 1, wherein:

the respective side members have a square closed cross-section structure combining two crank-like bent plate members, and the respective plate members are assembled so that flanges for connecting the respective plate members are oriented in an upward or downward direction.

13. The vehicle front structure according to claim 1, wherein:

the front cross member is arranged at a position overlapping with an inward bending occurrence point of the front side member in the vehicle longitudinal direction in a front collision state corresponding to a front collision to the vehicle front structure.

14. The vehicle front structure according to claim 13, wherein:

the inward bending occurrence point of the front side member is a position where a gusset plate, which connects a crush box attached to a front portion of the front side member on an outer side of the front side member in the vehicle width direction and an outside surface of the front side member in the vehicle width direction, is connected to the front side member.

* * * * *